(12) United States Patent
Zimmer

(10) Patent No.: US 8,021,467 B2
(45) Date of Patent: Sep. 20, 2011

(54) CLEANING PROCESS FOR CLEANING FILTRATION MATERIAL OF A GAS FILTER AND A DEVICE FOR CARRYING OUT THE PROCESS

(76) Inventor: Sebastian Zimmer, Guangzhou (CN)

( * ) Notice: Subject to any disclaimer, the term of this patent is extended or adjusted under 35 U.S.C. 154(b) by 443 days.

(21) Appl. No.: 12/089,889

(22) PCT Filed: Oct. 10, 2006

(86) PCT No.: PCT/CN2006/002656
§ 371 (c)(1),
(2), (4) Date: Aug. 11, 2008

(87) PCT Pub. No.: WO2007/041955
PCT Pub. Date: Apr. 19, 2007

(65) Prior Publication Data
US 2008/0307959 A1    Dec. 18, 2008

(30) Foreign Application Priority Data
Oct. 11, 2005    (CN) .......................... 2005 1 0113031

(51) Int. Cl.
*B01D 46/04*    (2006.01)
(52) U.S. Cl. ................ 95/279; 95/280; 55/283; 55/284; 55/286; 55/287; 55/291; 55/302; 55/303; 55/341.1
(58) Field of Classification Search ............ 55/284, 55/286, 287, 288, 291, 292, 302, 303, 304, 55/341.1, 283; 95/279, 280
See application file for complete search history.

(56) References Cited

U.S. PATENT DOCUMENTS

| | | | | |
|---|---|---|---|---|
| 2,954,873 A * | 10/1960 | Davis | ......................... | 210/333.1 |
| 3,243,940 A * | 4/1966 | Larson | ............................. | 95/279 |
| 4,046,526 A * | 9/1977 | Phillippi | ......................... | 95/279 |
| 4,247,310 A | 1/1981 | Borst | | |
| 4,292,053 A * | 9/1981 | Remillieux | ..................... | 95/279 |
| 4,433,986 A * | 2/1984 | Borst | .............................. | 96/428 |

(Continued)

FOREIGN PATENT DOCUMENTS

| | | |
|---|---|---|
| DE | 31 14 068 A1 | 11/1982 |
| DE | 33 41 065 A1 | 5/1985 |
| DE | 199 44 057 A1 | 3/2000 |
| EP | 0 774 289 A1 | 5/1997 |
| WO | WO 98/05407 | 2/1998 |

OTHER PUBLICATIONS

Machine translation of German Patent No. DE 3341065, published May 30, 1985.* PCT/CN2006/002656 PCT/ISA/210.
European Search Report.
International Preliminary Report on Patentability, 5 pages.

*Primary Examiner* — Robert Clemente
(74) *Attorney, Agent, or Firm* — Crowell & Moring LLP

(57) ABSTRACT

A cleaning process for filtration material of a gas filter is disclosed. A first step hinders the gas flow from passing through the filtration material by closing the clean gas side of a single segment or a row of filter segments. A second step provides a slow gas flow to the closed filter segments to cause a reverse gas flow through the filtration material. A third step opens an impulse valve for an ultra short time to create a compressed gas impulse for disengaging the particles which did not fall off the filtration material during the second step of the cleaning process. A fourth step shuts off the reverse flow gas supply. A device for separating one or several filter segments from the clean gas side of the filter filtration material is also disclosed.

7 Claims, 4 Drawing Sheets

U.S. PATENT DOCUMENTS

| | | | |
|---|---|---|---|
| 4,878,926 A * | 11/1989 | Goodrich | 55/294 |
| 5,269,835 A * | 12/1993 | Jensen | 95/279 |
| 5,405,421 A * | 4/1995 | Swisher, Jr. | 55/284 |
| 5,421,845 A * | 6/1995 | Gregg et al. | 55/294 |
| 5,549,734 A * | 8/1996 | Standard | 95/279 |
| 6,309,447 B1 * | 10/2001 | Felix | 95/280 |
| 6,319,295 B1 * | 11/2001 | Tojner | 55/302 |
| 2003/0041729 A1 * | 3/2003 | Finigan | 95/26 |

* cited by examiner

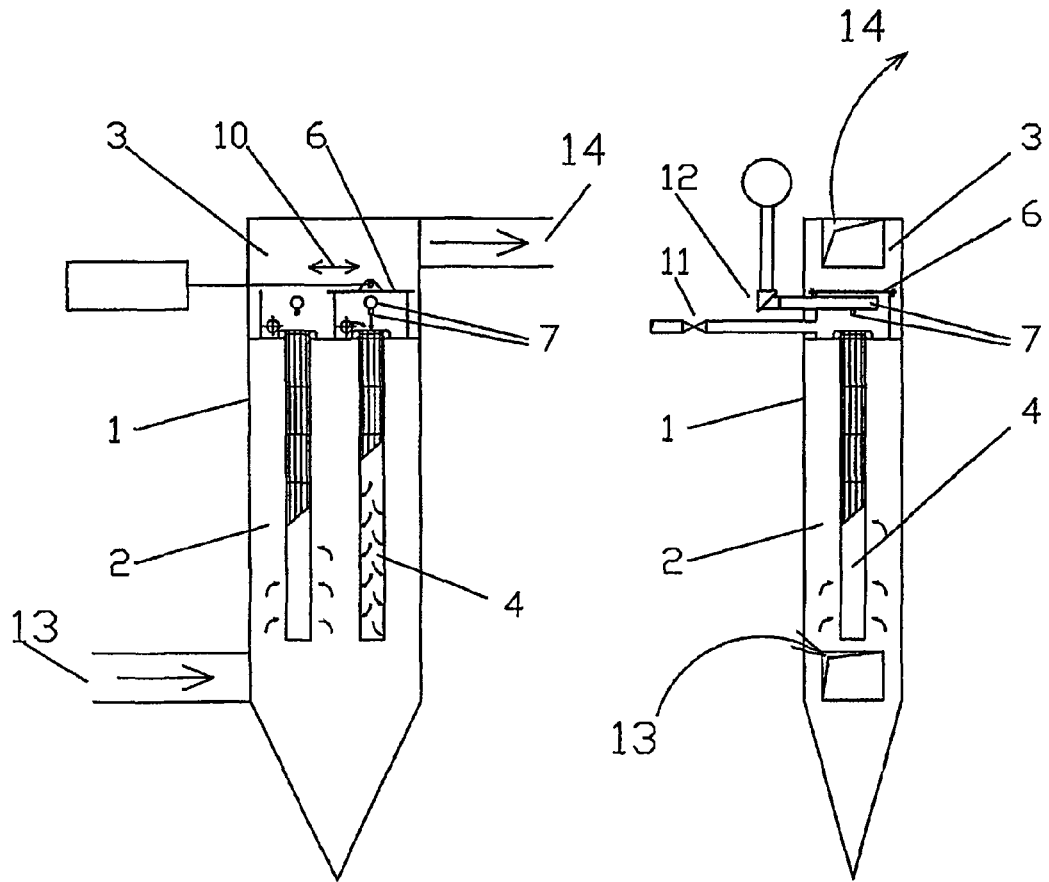

CLEANING PROCESS FOR CLEANING FILTRATION MATERIAL OF A GAS FILTER AND A DEVICE FOR CARRYING OUT THE PROCESS

FIELD OF THE INVENTION

The invention is related to a cleaning process for cleaning filtration material of a gas filter which is used to clean filter filtration material of any shape, material and size arranged in a single filter segment or in filter segment sets, whereby particle-laden gas flows to the filtration material, being for instance a fabric or another porous material, while the particles are held back by the filtration material and the clean or almost clean gas passes through. The invention also describes a method and a device for separating a single or several filter segments from the filtration material clean gas side or particle-laden gas side.

BACKGROUND INFORMATION

Conventional filter filtration material technologies (especially for fabric filter) operate as reverse flow cleaning systems or as online pulse jet cleaning systems. The reverse flow technology is rather old while the pulse jet technology is presently the most common.

The reverse flow technology normally separates a complete filter chamber, having 10% to 25% of the overall filtration area, from the filtering operation. Then, cleaning gas, which is often the gas from the clean gas side of the filter filtration material, is conveyed by means of a fan into the separated filter chamber to create a reverse flow through the filtration material. This technology requires an expensive and complex design of the filter system (e.g. big dampers for raw gas and clean gas) and requires more filtration material (for an increased filtration surface). Furthermore, the area of the part of the filter still in operation has to be increased due to the additional cleaning gas back flowing which has to be cleaned as well. Finally, the method is not very effective and provides only low operation safety (capability to cover changing filtration conditions). The advantage is, however, that no expensive compressed cleaning gas is required.

The pulse jet technology is presently the most common cleaning technology. It is a so-called online cleaning technology in which the filter segments to be cleaned are not separated from the gas stream. The cleaning is achieved by providing a high pressure gas impulse which causes a shock wave that sets the filtered particles (filter-cake) into vibration. The gas impulse used must be so strong that the filtered particles overcome the adherence to the filtration material caused by the gas stream still flowing through the filtration material; the efficiency of the vibration is not guaranteed. The disadvantages of this technology are, (1) that a huge amount of compressed cleaning gas is required, (2) that the shock waves cause a strong stress on the filtration material, which reduces the life time of the material, and (3) that—caused by the gas flow still flowing through the filtration material—the filtered particles are massaged into the filtration material, which increases the pressure drop of the filtration material up to 20 times. A further disadvantage is that cleaning with a filter-cake blast causes a stream of fine particles which return to the cleaned filter segment or to the one next to it. The aforementioned disadvantages reduce the efficiency of the technology and demand a low gas to filtration material ratio (that is: amount of gas flow per unit of time and per square meter). The advantages of this technology are, however, that no separation of the segments is necessary and that no complex ductwork for the cleaning gas is needed.

CONTENT OF THE INVENTION

The first object of the invention is to supply a cleaning process for filtration material of a gas filter which is called "Reverse flow Pulse" (RfP) technology. Compared to conventional cleaning process for filtration material, an RfP-equipped filter can be operated with a higher gas to filtration material ratio. Moreover, the consumption of compressed cleaning gas and the filtration material stress is reduced while the cleaning efficiency is increased. The equipment necessary to apply the "RfP"-technology is simple, effective and cheap.

The second object of the invention is to supply a method and a device for separating a single or several filter segments from the filter clean gas side or the particle-laden gas side, respectively.

The process of cleaning filtration materials of a gas filter according to the invention comprises the four followings steps:

Step one, separating (closing) one or several filter segments from the gas filter.

Step two, providing a clean gas stream through the filtration material of the separated segment/segments which is reverse to the normal particle-laden gas flow.

Step three, providing a shock wave by a compressed gas impulse or other methods to achieve a cleaning vibration to the filtration material.

Step four, shutting off the cleaning gas mentioned in step two.

Stated clearly, the invention is directed to a process for removing the separated particles from the filtration material by means of a four step cleaning procedure. Step one hinders the gas flow from passing through the filtration material by closing a single segment or a row of filter segments. Step two provides a slow gas flow to the separated filter segments to cause a reverse gas flow through the filtration material. Step three opens an impulse valve (e.g. diaphragm valve) for an ultra short time to create a compressed gas impulse for disengaging the particles which did not fall off the filtration material during step two of the cleaning process. Step four shuts off the reverse flow gas supply.

The advantage of this invention is that the filtration material is pre-cleaned in step two of the cleaning process by applying cheap low pressure cleaning gas. The slow reverse flow through the filtration material avoids blasting of the filter-cake (agglomerated particles adhering to the filtration material) and cleans the filtration material in a gentle manner. Step three provides final cleaning by the compressed gas impulse which shakes or blows off the rest of the filtered particles and is supported by the reverse flow gas. The invention combines the "reverse flow cleaning method" with the "pulse jet cleaning method" to achieve final and complete cleaning of the filtration material.

Due to the high efficiency of the "RfP"-technology, the filter area in comparison with the reverse flow system or pulse jet system can be reduced by 10% to 25%, the pressure of compressed gas and its consumption can be reduced by 20% to 50% or the filter pressure drop can be reduced up to 50%. The lifetime of the filtration material is increased by at least 200%. The technology provides highest operation safety even under changing operation and dust conditions. Moreover, the technology is simple and cheap.

BRIEF DESCRIPTION OF THE DRAWINGS

Further explanations on the invention are given by the following figures and examples:

FIG. 1, a principle sketch of the structure of the fabric filter filtration system according to example 1;

FIG. 2, the left-side-view of FIG. 1;

In the figures: 1. casing, 2. filter filtration material particle-laden gas side, 3. filter filtration material clean gas side, 4. filter segment, 5. filter segment row, 6. slide plate, 7.+8. nozzle, 9. filter segment rows, 10. plate move or turn direction, 11. valve of cleaning gas, 12. pulse valve (e.g. diaphragm valve), 13. particle-laden gas inlet, 14. cleaning gas outlet, 15. raster unit, 16. row filter.

DETAILED DESCRIPTION

Figure 3:
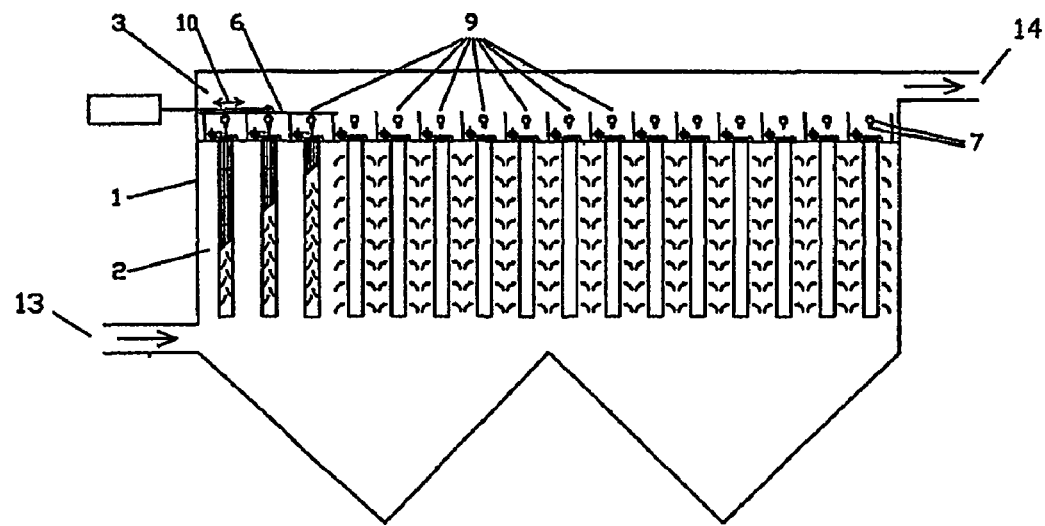
FIG. 3, a principle sketch of the structure of the fabric filter filtration system according to example 2.
Figure 4:
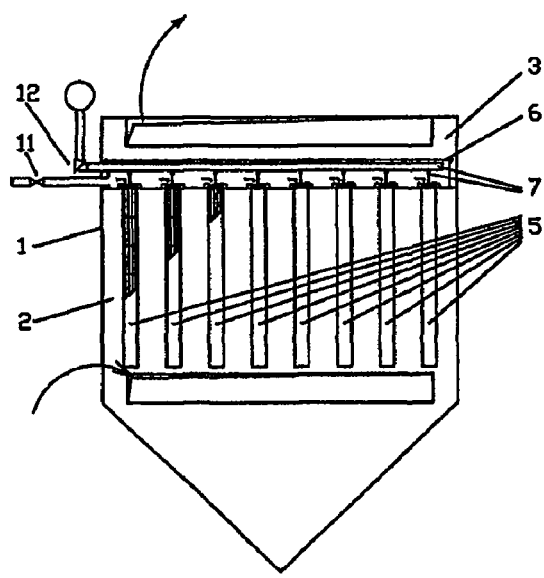
FIG. 4, the left-side-view of FIG. 3.
Figure 5:
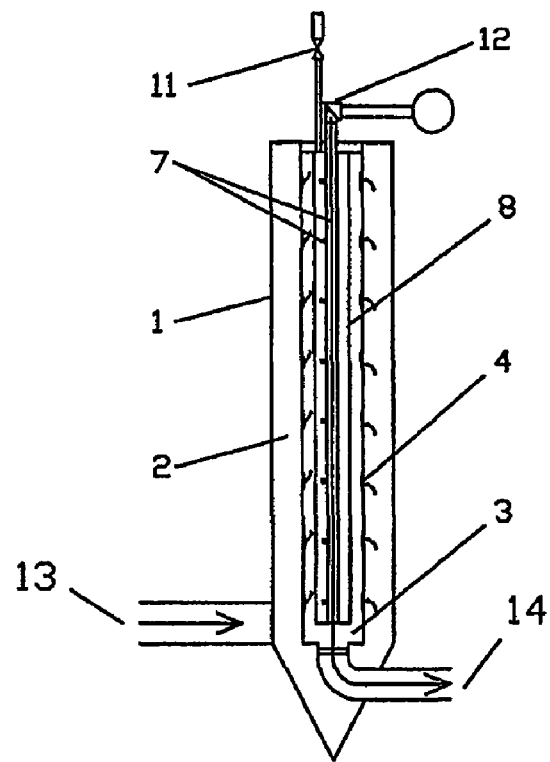
FIG. 5, a principle sketch of the structure of a membrane filter filtration system.
Figure 6:
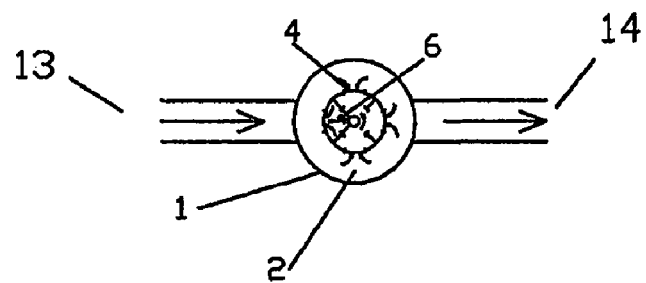
FIG. 6, the top-view of FIG. 5.

The invention is suitable for all cleaning systems for gas filter filtration material. The following describes the "RfP"-technology according to examples of a fabric filter filtration material cleaning system (FIGS. 1-4) and of a membrane filter filtration material cleaning system (FIGS. 5, 6).

The filter filtration material cleaning system shown in each figure contains a casing (1) with a particle-laden gas side (2) and a clean gas side (3). A single filter segment (4) or a row of filter segments (5) can be separated from the normal gas stream by a slide plate (6), which is located next to a filter segment, covering the nozzle pipe (7) or being connected to the nozzle pipe (8). The slide plate (6) can also cover several filter segment rows (9) (see FIG. 4).

In step one of the cleaning procedure, the slide plate (6) opens one filter segment, a row or several rows of filter segments, which reduces the filter filtration material pressure loss immediately, and slowly closes another filter segment, another row or other rows at the same time by moving or turning (directions as arrow 10).

In step two, the valve (11) of the cleaning gas is opened which leads to a reverse gas flow through the filtration material and removes the main part of particles in the form of a filter-cake.

Step three provides final cleaning of the filtration material by a gas blast (shock wave) due to an ultra short opening of the impulse valve (e.g. diaphragm valve) (12). The blast (shock wave) is distributed by the nozzle pipe (7 or 8).

Step four takes place after a further short period (approximately 10 seconds), the cleaning gas valve (11) is closed and the system stays on standby, waiting for the control system to reduce the filter pressure loss by starting a new cleaning cycle.

The "RfP"-technology combines the advantages of both aforementioned technologies of reverse flow system and pulse jet system. It separates one or several filter segments from the system and pre-cleans them with a soft reverse gas flow. This soft cleaning ensures that the main filter-cake falls down in big chunks (agglomerates) without increasing the load on the other filter segments. Moreover, due to the reverse flow, the particles do not immediately return to the filtration material, which is normally caused by gas flow or static forces, etc. After this, the technology provides final cleaning of the filter segments by an ultra short compressed gas shock wave which is supported by the reverse flow cleaning gas. The combination of the reverse flow and the shock wave provides highest cleaning efficiency and prevents the particles from being massaged into the filter material. The pressure drop over the filter material always stays low. Due to the high cleaning efficiency of the "RfP"-technology, filter systems with high gas to filtration material ratios can be designed.

Optionally, the cleaning gas needed in step two is heated.

Optionally, the cleaning gas needed in step two can be gas from the clean gas side of the filter which is conveyed into the separated segments by means of a blower or an ejector pump.

Optionally, several filter segments or rows of filter segments, which are located next to each other, are closable, to have the option of cleaning them at the same time or one by one.

Optionally, the closed filter segment, segments or rows of segments stay closed until the increased pressure drop of the filter system demands further cleaning.

Figure 7:
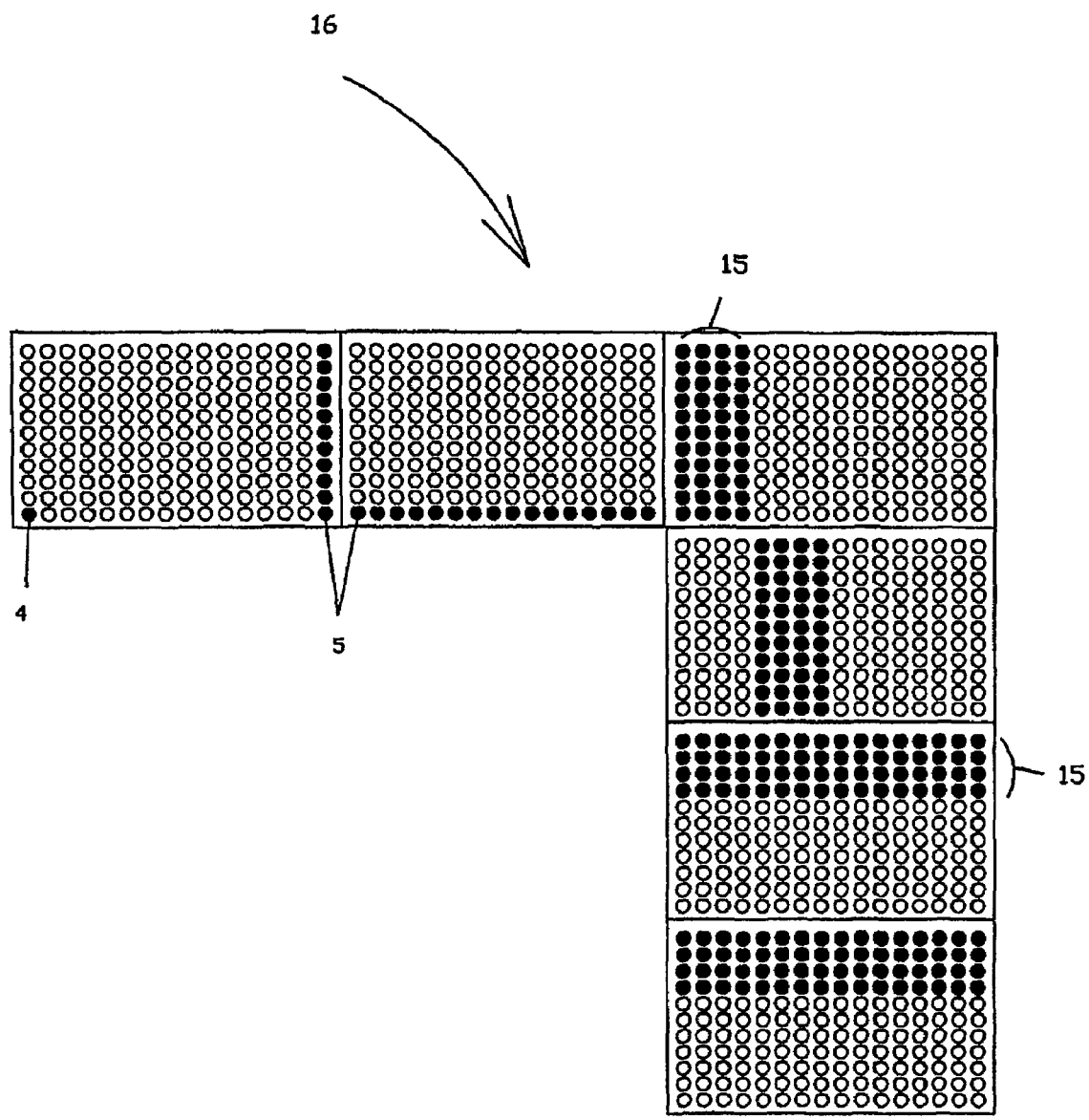
FIG. 7, a principle sketch of the structure of a row filter consisting of rows of raster units.

Optionally, for a so-called row-filter (16)—according to FIG. 7—consisting of at least two raster units (a raster unit (15) consists of at least two rows of filter segments (9)) or for a filter, which has at least two parallel arranged rows of raster units, each raster unit can have a separate clean gas chamber which is separated from the clean gas duct by a damper, or several raster units have a combined clean gas chamber which is separated by a damper from the other raster units or one common combined clean gas chamber for all raster units is provided.

Optionally, the filter segment is separated only from one side of the filter (clean gas or particle laden gas side).

A device, which is used in the process of separating one or several filter segments from the clean gas side or particle-laden gas side of the filter, has a slide plate (or lid, cap) (6), which is near the filter segment and which covers the nozzle pipe (7) or is connected to the nozzle pipe (8); optionally, a single filter segment (4) or row of filter segments (5) can be separated from the filter operation; optionally, the plate (or lid, cap) (6) can cover several rows of filter segments (9); optionally, several filter segments can be put back into filtering operation at the same time or individually one by one, depending on the speed of the pressure-drop-change of the filtration material, by moving or turning the plate (or lid, cap) (6).

The invention claimed is:

1. A process of cleaning a filtration material of a gas filter, wherein the gas filter includes a plurality of filter segments which are arranged next to one another in a casing and a slide plate, comprising the steps of:

closing a filter segment of the plurality of filter segments from a normal gas stream by moving the slide plate, wherein the slide plate covers a nozzle pipe of the closed filter segment and wherein when the slide plate is moved to close the filter segment the slide plate opens a filter segment of the plurality of filter segments that was previously closed;

providing a cleaning gas stream through the filtration material of the closed filter segment which is reverse to a normal particle-laden gas flow to remove a main part of particles in a form of a filter-cake;

providing a shock wave by a compressed gas impulse from the nozzle pipe to achieve a cleaning vibration to the filtration material of the closed filter segment to provide a final cleaning of the closed filter segment; and shutting off the cleaning gas stream.

2. The process of cleaning a filtration material of a gas filter according to claim 1, wherein the cleaning gas stream is heated.

3. The process of cleaning a filtration material of a gas filter according to claim 1, wherein the cleaning gas stream is gas from a clean gas side of the gas filter which is conveyed into the closed filter segment by a blower or an ejector pump.

4. The process of cleaning a filtration material of a gas filter according to claim 1, wherein several filter segments or rows of filter segments, which are located next to each other, are closed such that they are cleaned at a same time or one by one.

5. The process of cleaning a filtration material of a gas filter according to claim 1, wherein the closed filter segment stays closed until an increased pressure drop of a filter system demands further cleaning.

6. The process of cleaning a filtration material for a gas filter according to claim 1, wherein for a row-filter consisting of at least two raster units or for a filter which has at least two parallel arranged rows of raster units, each raster unit has a separate clean gas chamber which is separated from a clean gas duct by a damper or several raster units have a combined clean gas chamber which is separated by a damper from other raster units or a common combined clean gas chamber for all raster units is provided.

7. The process of cleaning a filtration material of a gas filter according to claim 1, wherein the closed filter segment is closed only from a clean gas side of the gas filter.

* * * * *